United States Patent
Dames

(10) Patent No.: US 6,878,764 B2
(45) Date of Patent: *Apr. 12, 2005

(54) STABILIZED BLACK POLYOXYMETHYLENE MOULDING MATERIALS

(75) Inventor: Burkhardt Dames, Heppenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 62 days.

This patent is subject to a terminal disclaimer.

(21) Appl. No.: 10/312,543

(22) PCT Filed: Jun. 22, 2001

(86) PCT No.: PCT/EP01/07130

§ 371 (c)(1),
(2), (4) Date: Dec. 30, 2002

(87) PCT Pub. No.: WO02/00789

PCT Pub. Date: Jan. 3, 2002

(65) Prior Publication Data

US 2003/0181567 A1 Sep. 25, 2003

(30) Foreign Application Priority Data

Jun. 29, 2000 (DE) ......................... 100 30 635

(51) Int. Cl.$^7$ ............................. C08K 5/29; C08K 3/04
(52) U.S. Cl. ...................... 524/186; 524/495; 524/496; 524/500
(58) Field of Search ................ 524/186, 495, 524/496, 500

(56) References Cited

U.S. PATENT DOCUMENTS

| | | | |
|---|---|---|---|
| 3,428,608 A | * 2/1969 | Hofton et al. | ............... 525/410 |
| 3,775,363 A | 11/1973 | Braunstein | |
| 4,046,843 A | 9/1977 | Sano et al. | |
| 4,342,680 A | 8/1982 | Sugio et al. | |
| 4,360,617 A | 11/1982 | Mueller et al. | |
| 4,386,178 A | 5/1983 | Schuette et al. | |
| 4,837,400 A | 6/1989 | Walter et al. | |
| 4,987,176 A | * 1/1991 | Goerrissen et al. | ......... 524/456 |
| 6,329,448 B1 | * 12/2001 | Gutsche et al. | ............. 523/319 |
| 2003/0105199 A1 | * 6/2003 | Furukawa et al. | .......... 524/386 |

FOREIGN PATENT DOCUMENTS

| | | |
|---|---|---|
| DE | 36 28 561 | 3/1988 |
| DE | 36 28562 | 3/1988 |
| EP | 19 761 | 12/1980 |

OTHER PUBLICATIONS

USPTO obtained translation of DE 3628561 (Mar. 3, 1988) Goerrissen et al.*
USPTO obtained translation of EP 19761 (Dec. 10, 1980) Boehlke et al.*
USPTO obtained translation of WO 00/11083 (Mar. 2, 200) Dames, Burkhardt.*
USPTO obtained translation of DE 3628562 (Mar. 3, 1988) Goerrissen et al.*
Derwent ACC–No.: 1980–88506C, EP 19761–A (Dec. 9, 1980) Boehlke, et al.*
Derwent ACC–No.: 1988–064905, DE 3628561–A (Mar. 3, 1988) Goerrissen, et al.*
Derwent ACC–No.: 1988–064906, DE 3628562–A (Mar. 3, 1988) Goerrissen, et al.*
Derwent ACC–No.: 1968–28886Q, JP 69011906 B (1968).*
Derwent ACC–No.: 1994–330256, JP 06256621 A (Sep. 13, 1994) Toray Ind Inc (TORA).*
Ullmann's Encyclopedia of Ind. Chem. 6$^{th}$ Ed. (2000 Electronic Release), keyword=AZIRIDINES, part "6.Uses" (Wiley–VCH Verlag GmbH, Weinheim, Germany).

* cited by examiner

*Primary Examiner*—Matthew A. Thexton
(74) *Attorney, Agent, or Firm*—Keil & Weinkauf

(57) ABSTRACT

Thermoplastic molding compositions comprising, as substantive components,

A) from 5% by weight to (99.99% by weight minus 1 ppb), based on components A) to D), of a polyoxymethylene homo- or copolymer, B) from 1 ppb to 1% by weight, based on the molding composition made from A) to D), of at least one polyethyleneimine homo- or copolymer, C) from 0.01 to 15% by weight of carbon black, and D) from 0 to 80% by weight of other additives, where the total of percentages by weight of components A) to D) is always 100%.

6 Claims, No Drawings

STABILIZED BLACK POLYOXYMETHYLENE MOULDING MATERIALS

The invention relates to thermoplastic molding compositions comprising, as substantive components,
- A) from 5% by weight to (99.99% by weight minus 1 ppb), based on components A) to D), of a polyoxymethylene homo- or copolymer,
- B) from 1 ppb to 1% by weight based on the molding compositions made from A) to D), of at least one polyethyleneimine homo- or copolymer,
- C) from 0.01 to 15% by weight of carbon black, and
- D) from 0 to 80% by weight of other additives, where the total of percentages by weight of components A) to D) is always 100%.

The invention further relates to the use of the molding compositions of the invention for producing moldings of any type, and to the resultant moldings, and also to the use of polyethyleneimines for stabilizing polyoxymethylenes comprising carbon black, in particular under thermal stress.

Polyoxymethylene homo- and copolymers have been known for a long time. The polymers have many excellent properties and are therefore suitable for a wide variety of industrial applications. However, there have been many attempts to find means of improving their processability, e.g. their flowability, setting time, etc., and/or to improve the mechanical properties, and also the dimensional stability, of moldings produced from polymers of this type.

DE-A-23 19 359 teaches that molding compositions composed of from 98 to 25% by weight of oxymethylene copolymers and from 2 to 75% by weight of acicular calcium metasilicate have improved processability, dimensional stability and heat-aging properties.

The prior art also includes the stabilization of polyoxymethylene molding compositions by suitable additives. To this end, antioxidants, e.g. stearically hindered phenol derivatives, are added to the polyoxymethylene molding compositions. Phenol derivatives of this type are summarized in DE-A-27 02 661.

EP-A-19 761 incorporates alkoxymethylmelamines into glass-fiber-reinforced polyoxymethylene molding compositions to improve their impact strength. According to EP-A-52 740, adding a partially etherified specific melamine-formaldehyde condensation product gives polyoxymethylene molding compositions resistant to exposure to heat in the range from 100 to 150° C. for a prolonged period. DE-A-3 011 280 describes stabilized oxymethylene copolymer compositions which have a stabilizer comprising a mixture made from at least one amino-substituted triazine and from at least one sterically hindered phenol and from at least one metal-containing compound. The metal-containing compounds here are preferably composed of potassium hydroxide, calcium hydroxide, magnesium hydroxide, or magnesium carbonate.

However, despite these measures, known polyoxymethylene molding compositions have insufficient thermal stability for some applications, and this adversely affects their processing to give moldings and, for example, contributes to the formation of deposits on the mold or to poorer demolding, and/or leads to discoloration and impairment of mechanical properties during subsequent use of the moldings. Another disadvantage is that the mixtures may still comprise formaldehyde adducts which during processing at elevated temperatures can lead to odor problems and molecular-weight reduction via elimination of formaldehyde.

DE-A 36 28 560, DE-A 36 28 561 and DE-A 36 28 562 disclose polyoxymethylene molding compositions in which the stabilizers present comprise a mixture made from sterically hindered phenols and from alkaline earth metal silicates and from alkaline earth metal glycerophosphates. According to the description, it is also possible to use polyamides as further costabilizers. Although these compositions have improved thermal stability, they remain unsatisfactory for color quality and molecular-weight degradation.

DE-A 198 37 686 proposes black POM molding compositions which comprise redox agents as stabilizers.

Polyethyleneimines are likewise known per se and are used in papermaking: they aggregate the paper fibers and bind undesirable minor components, i.e. they are used as aggregators and as flocculators and complexers, improving the wet strength of the paper. Polyethyleneimines are also used in the production of colorants and coatings, and in laminated polypropylene composite films, and in the production of petroleum and of natural gas, and finally for immobilizing enzymes. See Ullmann's Encyclopedia of Industrial Chemistry, 6th edn., 1999 Electronic Release, Verlag VCH Weinheim, Keyword "Aziridines", Chap. 6 "Uses" (referred to below as "Ullmann Electronic Release"). The use of polyethyleneimines as a constituent of thermoplastic molding compositions has not been disclosed.

It is an object of the present invention, therefore, to provide polyoxymethylene molding compositions comprising carbon black and having improved thermal stability and reduced tendency toward molecular-weight degradation during processing (in particular caused by addition of carbon black).

We have found that this object is achieved by means of the molding compositions defined at the outset. Preferred embodiments are given in the subclaims. The use of polyethyleneimine for increasing the thermal stability of polyoxymethylenes has also been found, particularly that of polyoxymethylenes which have black to gray coloration.

As component A), the molding compositions of the invention comprise from 5% by weight to (99.99% by weight minus 1 ppb) of at least one polyoxymethylene homo- or copolymer. The proportion of A) is preferably from 30% by weight to (99.95% by weight minus 1 ppm), and in particular from (80% by weight minus 1 ppm) to (99.9% by weight minus 1 ppm). These data are based on the molding compositions made from A) to D). ppb means parts per billion (by weight)=$1:10^9$, and ppm means parts per million (by weight)=$1:10^6$.

The term (99.99% by weight minus 1 ppb) means the proportion in percent by weight obtained when 1 ppb is substrated from 99.99% by weight. The term is written in this way for reasons of clarity rather than as 99.999 . . . with a large number of nines after the decimal point. The same applies to the terms (99.95 or 99.99% by weight minus 1 ppm) and (80% by weight minus 1 ppm).

Polymers of this type are known to the skilled worker and are described in the literature.

These polymers very generally have at least 50 mol % of recurring —$CH_2O$— units in their main polymer chain.

The homopolymers are generally prepared by polymerizing formaldehyde or trioxane, preferably in the presence of suitable catalysts.

Very generally, these polymers comprise at least 50 mol % of —$CH_2O$— repeat units in the main polymer chain.

The homopolymers are generally prepared by polymerizing formaldehyde or trioxane, preferably in the presence of suitable catalysts.

For the purposes of the invention, component A is preferably polyoxymethylene copolymers, especially those which, besides the recurring —CH$_2$O— units, also have up to 50 mol %, preferably from 0.1 to 20 mol %, in particular from 0.3 to 10 mol %, and very particularly preferably from 2 to 6 mol %, of repeat units

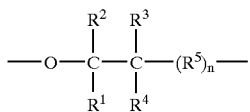

where R$^1$ to R$^4$, independently of one another, are hydrogen, C$_1$-C$_4$-alkyl or halogen-substituted alkyl having from 1 to 4 carbon atoms, and R$^5$ is —CH$_2$—, —CH$_2$O—, C$_1$-C$_4$-alkyl- or C$_1$-C$_4$-haloalkyl-substituted methylene or a corresponding oxymethylene group, and n is from 0 to 3. These groups may be advantageously introduced into the copolymers by ring-opening of cyclic ethers. Preferred cyclic ethers have the formula

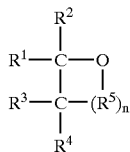

where R$^1$ to R$^5$ and n are as defined above. Mention may be made, merely as examples, of ethylene oxide, propylene 1,2-oxide, butylene 1,2-oxide, butylene 1,3-oxide, 1,3-dioxane, 1,3-dioxolane and 1,3-dioxepan as cyclic ethers, and also linear oligo- and polyformals, such as polydioxolane or polydioxepan as comonomers.

Other suitable components A) are oxymethylene terpolymers, prepared, for example, by reacting trioxane, one of the cyclic ethers described above and a third monomer, preferably bifunctional compounds of the formula

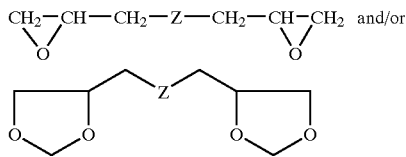

where Z is a chemical bond, —O—, —ORO— (R=C$_1$-C$_8$-alkylene or C$_2$-C$_8$-cycloalkylene).

Preferred monomers of this type are ethylene diglycide, diglycidyl ether and diethers made from glycidyl compounds and formaldehyde, dioxane or trioxane in a molar ratio of 2:1, and also diethers made from 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol or 1,4-cyclohexanediol, to mention merely a few examples.

Processes for preparing the homo- and copolymers described above are known to the person skilled in the art and described in the literature, and further details are therefore superfluous here.

The preferred polyoxymethylene copolymers have melting points of at least 150° C. and molecular weights (weight-average) M$_w$ in the range from 5000 to 200,000, preferably from 7000 to 150,000.

Particular preference is given to end-group-stabilized polyoxymethylene polymers which have C—C bonds at the ends of the chains.

According to the invention, as component B), the thermoplastic molding compositions comprise from 1 ppb to 1% by weight of at least one polyethyleneimine homo- or copolymer. The proportion of B) is preferably from 1 ppm to 0.5% by weight, and in particular from 1 ppm to 3000 ppm. These data are based on the molding compositions made from A) to D). The terms ppb and ppm have been defined above under component A).

For the purposes of the present invention, polyethyleneimines are either homo- or copolymers, prepared by the processes in Ullmann Electronic Release under the keyword Aziridines or as in WO-A 94/12560, for example.

The homopolymers are generally obtainable by polymerizing ethyleneimine (aziridine) in aqueous or organic solution in the presence of acid-releasing compounds, acids or Lewis acids. Homopolymers of this type are branched polymers which generally contain primary, secondary and tertiary amino groups in a ratio of about 30%:40%:30%. The distribution of the amino groups can generally be determined by $^{13}$C NMR spectroscopy.

Comonomers used are preferably compounds having at least two amino functions. Suitable comonomers which may be mentioned as examples are alkylenediamines having from 2 to 10 carbon atoms in the alkylene radical, preferably ethylenediamine or propylenediamine. Other suitable comonomers are diethylenetriamine, triethylenetetramine, tetraethylenepentamine, dipropylenetriamine, tripropylenetetramine, dihexamethylenetriamine, aminopropylethylenediamine and bisaminopropylethylenediamine.

Polyethyleneimines usually have an average molecular weight (weight-average) of from 100 to 3,000,000, preferably from 800 to 2,000,000 (determined by light scattering). The viscosity to ISO 2555 (at 20° C.) is generally within the range from 100 to 200,000 mPas, preferably from 1000 to 100,000 mPas.

Other suitable polyethyleneimines are crosslinked polyethyleneimines obtainable by reacting polyethyleneimines with bi- or polyfunctional crosslinkers having, as functional group, at least one halohydrin, glycidyl, aziridine, or isocyanate unit, or a halogen atom. Examples which may be mentioned are epichlorohydrin, and bischlorohydrin ethers of polyalkylene glycols having from 2 to 100 units of ethylene oxide and/or of propylene oxide, and also the compounds listed in DE-A 19 93 17 20 and U.S. Pat. No. 4,144,123. Processes for preparing crosslinked polyethyleneimines are known, for example from the abovementioned publications, and also EP-A 895 521 and EP-A 25 515.

Grafted polyethyleneimines are also suitable, and the grafting agents used here may be any compounds which can react with the amino and/or imino groups of the polyethyleneimines. Suitable grafting agents and processes for preparing grafted polyethyleneimines are found in EP-A-675 914, for example.

Other suitable polyethyleneimines for the purposes of the invention are amidated polymers, usually obtainable by reacting polyethyleneimines with carboxylic acids, their esters or anhydrides, carboxamides, or carbonyl halides. Depending on the proportion of amidated nitrogen atoms in the polyethyleneimine chain, the amidated polymers may subsequently be crosslinked using the crosslinkers mentioned. It is preferable here for up to 30% of the amino functions to be amidated, so that there are still sufficient primary and/or secondary nitrogen atoms available for a subsequent crosslinking reaction.

Alkoxylated polyethyleneimines are also suitable, and are obtainable by reacting polyethyleneimine with ethylene oxide and/or with propylene oxide, for example. These alkoxylated polymers, too, may be subsequently crosslinked.

Polyethyleneimines containing hydroxyl groups, and amphoteric polyethyleneimines (incorporating anionic groups) may also be mentioned as other suitable polyethyleneimines of the invention, as may lipophilic polyethyleneimines, which are generally obtained by incorporating long-chain hydrocarbon radicals into the polymer chain. Processes for preparing polyethyleneimines of this type are known to the skilled worker, and it is therefore unnecessary to give further details in this connection.

As component C), the compositions of the invention comprise from 0.01 to 15% by weight, preferably from 0.05 to 10% by weight, and in particular from 0.1 to 5% by weight, of carbon black. Suitable carbon blacks have a pore volume (DPB dibutyl phthalate adsorption) to DIN 53 601 of at least 30 ml/100 g, preferably at least 50 ml/100 g.

The DBP adsorption rate is generally determined to DIN 53 601 or ASTM D2414, and is a dimension relating to the structure of the particular carbon black. For the purposes of the present invention, the structure of the carbon black is the extent of linkage of primary carbon black particles to form aggregates. This parameter is determined by placing 10 g of carbon black in a kneader in which the force applied can be measured (Plastograph), and adding dibutyl phthalate dropwise until the point of maximum torque (wetting point for the carbon black) has been passed.

Component C) preferably has a BET specific surface area (to DIN 60 132 or ASTM D3037) of at least 20 m²/g, preferably 300 m²/g.

The average primary particle size is usually from 5 to 50 nm, preferably from 12 to 35 nm.

Examples of carbon black grades of this type are obtainable with the trademark Printex® XE2 (Degussa AG) or Ketjen Black EC DJ 600 (Akzo), or else as furnace blacks, such as Printex® 90, 75, 80, 85, or 95.

As component D), the molding compositions of the invention may comprise from 0 to 80% by weight, preferably from 0 to 30% by weight, of other additives.

Suitable sterically hindered phenols D) are in principle any of the compounds having a phenolic structure and having at least one bulky group on the phenolic ring.

Examples of compounds whose use is preferred are those of the formula

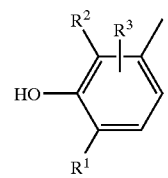

where:

$R^1$ and $R^2$ are alkyl, substituted alkyl or a substituted triazole group, where $R^1$ and $R^2$ may be identical or different, and $R^3$ is alkyl, substituted alkyl, alkoxy or substituted amino.

Antioxidants of the type mentioned are described, for example, in DE-A 27 02 661 (U.S. Pat. No. 4,360,617).

Another group of preferred sterically hindered phenols derives from substituted benzenecarboxylic acids, in particular from substituted benzenepropionic acids.

Particularly preferred compounds of this class have the formula

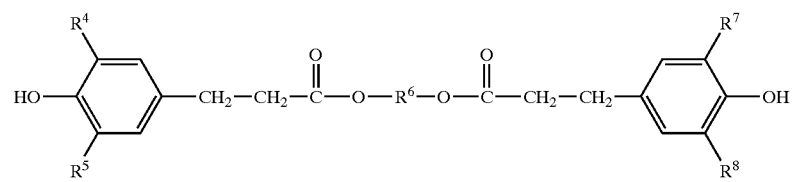

where $R^4$, $R^5$, $R^7$ and $R^8$, independently of one another, are $C_1-C_8$-alkyl which may in turn have substitution (at least one of these is a bulky group) and $R^6$ is a bivalent aliphatic radical which has from 1 to 10 carbon atoms and may also have C—O bonds in its main chain.

Preferred compounds of this formula are

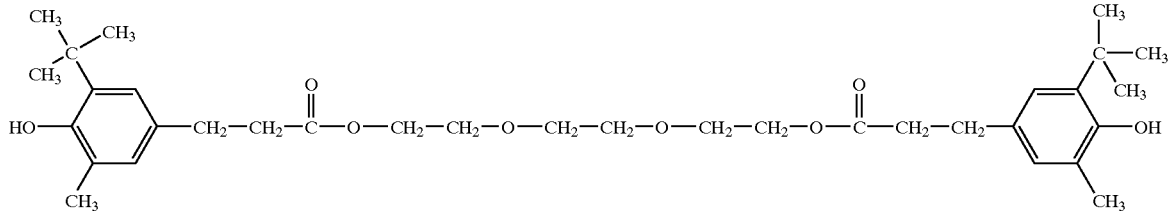

(Irganox® 245 from Ciba-Geigy)

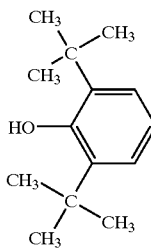 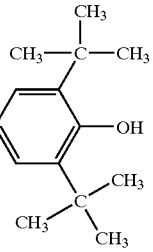

(Irganox® 259 from Ciba-Geigy)

The examples of sterically hindered phenols which should be mentioned are:

2,2'-methylenebis(4-methyl-6-tert-butylphenol), 1,6-hexanediol bis[3-(3,5-di-tert-butyl-4-hydroxyphenyl) propionate], pentaerythritol tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo [2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3, 5-di-tert-butyl-4-hydroxybenzyl)benzene, 4,4'-methylenebis (2,6-di-tert-butylphenol), 3,5-di-tert-butyl-4-hydroxybenzyldimethylamine and N,N'-hexamethylenebis-3,5-di-tert-butyl-4-hydroxyhydrocinnamide.

Compounds which have proven especially effective and which are therefore preferably used are 2,2'-methylenebis (4-methyl-6-tert-butylphenol), 1,6-hexanediol bis(3,5-di-tert-butyl-4-hydroxyphenylpropionate) (Irganox® 259), pentaerythritol tetrakis[3-(3,5-di-tert-butyl-4-hydroxyphenyl)propionate] and the Irganox® 245 described above from Ciba Geigy, which is particularly suitable.

The amounts present of the antioxidants (D), which may be used individually or as mixtures, are usually up to 2% by weight, preferably from 0.005 to 2% by weight, in particular from 0.1 to 1% by weight, based on the total weight of the molding compositions A) to C).

Sterically hindered phenols which have proven particularly advantageous, in particular when assessing color stability on storage in diffuse light over prolonged periods, in some cases have no more than one sterically hindered group in ortho position to the phenolic hydroxyl.

The polyamides which can be used as component D) are known per se. Use may be made of partly crystalline or amorphous resins as described, for example, in the Encyclopedia of Polymer Science and Engineering, Vol. 11, John Wiley & Sons, Inc., 1988, pp. 315–489. The melting point of the polyamide here is preferably below 225° C., and particularly preferably below 215° C.

Examples of these are polyhexamethyleneazelamide, polyhexamethylenesebacamide, polyhexamethylene-dodecanediamide, poly-11-aminoundecanamide and bis(p-aminocyclohexyl)methanedodecanediamide, and the products obtained by ring-opening of lactams, for example polylaurolactam. Other suitable polyamides are based on terephthalic or isophthalic acid as acid component and trimethylhexamethylenediamine or bis(p-aminocyclohexyl) propane as diamine component and polyamide base resins prepared by copolymerizing two or more of the abovementioned polymers or components thereof.

Particularly suitable polyamides which may be mentioned are copolyamides based on caprolactam, hexamethylenediamine, p,p'-diaminodicyclohexylmethane and adipic acid.

An example of these is the product marketed by BASF Aktiengesellschaft under the name Ultramid® 1 C.

Other suitable polyamides are marketed by Du Pont under the name Elvamide®.

The preparation of these polyamides is also described in the abovementioned text. The ratio of terminal amino groups to terminal acid groups can be controlled by varying the molar ratio of the starting compounds.

The proportion of the polyamide in the novel molding composition is up to 2% by weight, by preference from 0.005 to 1.99% by weight, preferably from 0.01 to 0.08% by weight.

The dispersibility of the polyamides used can be improved in some cases by concomitant use of a polycondensation product made from 2,2-di(4-hydroxyphenyl) propane (bisphenol A) and epichlorohydrin.

Condensation products of this type made from epichlorohydrin and bisphenol A are commercially available. Processes for their preparation are also known to the person skilled in the art. Tradenames of the polycondensates are Phenoxy® (Union Carbide Corporation) and Epikote® (Shell). The molecular weight of the polycondensates can vary within wide limits. In principle, any of the commercially available grades is suitable.

Other stabilizers which may be present in the novel polyoxymethylene molding compositions are one or more alkaline earth metal silicates and/or alkaline earth metal glycerophosphates in amounts of up to 2.0% by weight, preferably from 0.005 to 0.5% by weight and in particular from 0.01 to 0.3% by weight, based on the total weight of the molding compositions. Alkaline earth metals which have proven preferable for forming the silicates and glycerophosphates are calcium and, in particular, magnesium. Useful compounds are calcium glycerophosphate and preferably magnesium glycerophosphate and/or calcium silicate and preferably magnesium silicate. Particularly preferable alkaline earth metal silicates here are those described by the formula $$Me.xSiO_2.nH_2O$$

where:
Me is an alkaline earth metal, preferably calcium or in particular magnesium,
x is a number from 1.4 to 10, preferably from 1.4 to 6, and
n is greater than or equal to 0, preferably from 0 to 8.

The compounds are advantageously used in finely ground form. Particularly suitable products have an average particle size of less than 100 μm, preferably less than 50 μm.

Preference is given to the use of calcium silicates and magnesium silicates and/or calcium glycerophosphates and magnesium glycerophosphates. Examples of these may be defined more precisely by the following characteristic values:

Calcium silicate and magnesium silicate, respectively:

content of CaO and MgO, respectively: from 4 to 32% by weight, preferably from 8 to 30% by weight and in particular from 12 to 25% by weight, ratio of $SiO_2$ to CaO and $SiO_2$ to MgO, respectively (mol/mol): from 1.4 to 10, preferably from 1.4 to 6 and in particular from 1.5 to 4, bulk density: from 10 to 80 g/100 ml, preferably from 10 to 40 g/100 ml, and average particle size: less than 100 µm, preferably less than 50 µm.

Calcium glycerophosphates and magnesium glycerophosphates, respectively:

content of CaO and MgO, respectively: above 70% by weight, preferably above 80% by weight, residue on ashing: from 45 to 65% by weight, melting point: above 300° C., and average particle size: less than 100 µm, preferably less than 50 µm.

Preferred lubricants D) which may be present in the novel molding compositions are, in amounts of up to 5 [lacuna], preferably from 0.09 to 2 [lacuna] and in particular from 0.1 to 0.7 [lacuna], at least one ester or amide of saturated or unsaturated aliphatic carboxylic acids having from 10 to 40 carbon atoms, preferably from 16 to 22 carbon atoms, with polyols or with saturated aliphatic alcohols or amines having from 2 to 40 carbon atoms, preferably from 2 to 6 carbon atoms, or with an ether derived from alcohols and ethylene oxide.

The carboxylic acids may be mono- or dibasic. Examples which may be mentioned are pelargonic acid, palmitic acid, lauric acid, margaric acid, dodecanedioic acid, behenic acid and, particularly preferably, stearic acid, capric acid and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol and pentaerythritol, and preference is given to glycerol and pentaerythritol.

The aliphatic amines may be mono- to tribasic. Examples of these are stearylamine, ethylenediamine, propylenediamine, hexamethylenediamine and di(6-aminohexyl)amine, and particular preference is given to ethylenediamine and hexamethylenediamine. Correspondingly, preferred esters and amides are glycerol distearate, glycerol tristearate, ethylenediammonium distearate, glycerol monopalmitate, glycerol trilaurate, glycerol monobehenate and pentaerythritol tetrastearate.

It is also possible to use mixtures of different esters or amides or esters with amides combined, in any desired mixing ratio.

Other suitable compounds are polyether polyols and polyester polyols which have been esterified with mono- or polybasic carboxylic acids, preferably fatty acids, or have been etherified. Suitable products are available commercially, for example Loxiol® EP 728 from Henkel KGaA.

Preferred ethers derived from alcohols and ethylene oxide have the formula

where R is alkyl having from 6 to 40 carbon atoms and n is an integer greater than or equal to 1. R is particularly preferably a saturated $C_{16}$–$C_{18}$ fatty alcohol with n=50, obtainable commercially from BASF as Lutensol® AT 50.

The novel molding compositions may comprise from 0 to 5% by weight, preferably from 0.001 to 5% by weight, particularly preferably from 0.01 to 3% by weight and in particular from 0.05 to 1% by weight, of a melamine-formaldehyde condensate. This is preferably a crosslinked, water-insoluble precipitation condensate in finely divided form. The molar ratio of formaldehyde to melamine is preferably from 1.2:1 to 10:1, in particular from 1.2:1 to 2:1. The structure of condensates of this type and processes for their preparation are found in DE-A 25 40 207.

The novel molding compositions may comprise from 0.0001 to 1% by weight, preferably from 0.001 to 0.8% by weight, and in particular from 0.01 to 0.3% by weight, of a nucleating agent as component D).

Possible nucleating agents are any known compounds, for example melamine cyanurate, boron compounds, such as boron nitride, silica, pigments, e.g. Heliogen® Blue (copper phthalocyanine pigment; registered trademark of BASF Aktiengesellschaft), or branched polyoxymethylenes, which in these small amounts have a nucleating action.

Talc in particular is used as a nucleating agent and is a hydrated magnesium silicate of the formula $Mg_3[(OH)_2/Si_4O_{10}]$ or $MgO·4SiO_2·H_2O$. This is termed a three-layer phyllosilicate and has a triclinic, monoclinic or rhombic crystal structure and a lamellar appearance. Other trace elements which may be present are Mn, Ti, Cr, Ni, Na and K, and some of the OH groups may have been replaced by fluoride.

Particular preference is given to the use of talc in which 100% of the particle sizes are <20 µm. The particle size distribution is usually determined by sedimentation analysis and is preferably:

| | |
|---|---|
| <20 µm | 100% by weight |
| <10 µm | 99% by weight |
| <5 µm | 85% by weight |
| <3 µm | 60% by weight |
| <2 µm | 43% by weight |

Products of this type are commercially available as Micro-Talc I.T. extra (Norwegian Talc Minerals).

Examples of fillers which may be mentioned are amounts of up to 50% by weight, preferably from 5 to 40% by weight, of potassium titanate whiskers, carbon fibers, and preferably glass fibers. The glass fibers may, for example, be used in the form of glass wovens, mats, nonwovens and/or glass filament rovings or chopped glass filaments made from low-alkali E glass and having a diameter of from 5 to 200 µm, preferably from 8 to 50 µm. After they have been incorporated, the fibrous fillers preferably have an average length of from 0.05 to 1 µm, in particular from 0.1 to 0.5 µm.

Examples of other suitable fillers are calcium carbonate and glass beads, preferably in ground form, or mixtures of these fillers.

Other additives which may be mentioned are amounts of up to 50% by weight, preferably from 0 to 40% by weight, of impact-modifying polymers (also referred to below as elastomeric polymers or elastomers).

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or mixtures of these. Preference is given to 1,5-hexadiene-5-ethylidenenorbornene [sic] and dicyclopentadiene. The diene content of the EPDM rubbers is preferably from 0.5 bis 50% by weight, in particular from 1 to 8% by weight, based on the total weight of the rubber.

EPDM rubbers may also have been grafted with other monomers, e.g. with glycidyl (meth)acrylates, with (meth) acrylic esters, or with (meth)acrylamides.

Copolymers of ethylene with esters of (meth)acrylic acid are another group of preferred rubbers. The rubbers may also contain monomers having epoxy groups. These monomers containing epoxy groups are preferably incorporated into the rubber by adding, to the monomer mixture, monomers having epoxy groups and the formula I or II

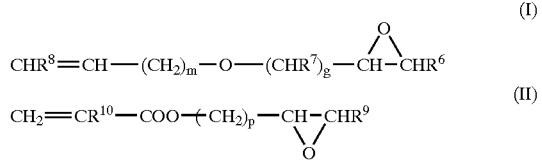

where $R^6$ to $R^{10}$ are hydrogen or alkyl having from 1 to 6 carbon atoms, and m is an integer from 0 to 20, g is an integer from 0 to 10 and p is an integer from 0 to 5.

$R^6$ to $R^8$ are preferably hydrogen, where m is 0 or 1 and g is 1. The corresponding compounds are allyl glycidyl ether and vinyl glycidyl ether.

Preferred compounds of the formula II are acrylic and/or methacrylic esters having epoxy groups, for example glycidyl acrylate and glycidyl methacrylate.

The copolymers are advantageously composed of from 50 to 98% by weight of ethylene, from 0 to 20% by weight of monomers having epoxy groups, the remainder being (meth) acrylic esters.

Particular preference is given to copolymers made from
from 50 to 98% by weight, in particular from 55 to 95% by weight, of ethylene, in particular from 0.3 to 20% by weight of glycidyl acrylate, and/or
from 0 to 40% by weight, in particular from 0.1 to 20% by weight, of glycidyl methacrylate, and
from 1 to 50% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by Blackley in the monograph "Emulsion Polymerization". The emulsifiers and catalysts which may be used are known per se.

In principle it is possible to use homogeneously structured elastomers or those with a shell construction. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, and corresponding methacrylates, and butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). When elastomers have more than one shell it is also possible for more than one shell to be composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, amino and amide groups, and also functional groups which may be introduced by concomitant use of monomers of the formula

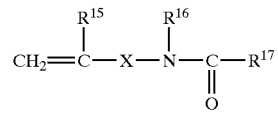

where:
$R^{15}$ is hydrogen or $C_1$–$C_4$-alkyl,
$R^{16}$ is hydrogen, $C_1$–$C_8$-alkyl or aryl, in particular phenyl,
$R^{17}$ is hydrogen, $C_1$–$C_{10}$-alkyl, $C_6$–$C_{12}$-aryl or —$OR^8$,
$R^{18}$ is $C_1$–$C_8$-alkyl or $C_6$–$C_{12}$-aryl, if desired with substitution by O— or N-containing groups,
X is a chemical bond, $C_1$–$C_{10}$-alkylene or $C_6$–$C_{12}$-arylene, or

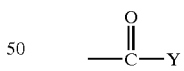

[lacuna]
The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate, butanediol diacrylate, and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of those compounds in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in component D) is generally up to 5% by weight, preferably not more than 3% by weight, based on D).

Some preferred emulsion polymers are listed below. Mention is made firstly of graft polymers with a core and with at least one outer shell and the following structure:

| Monomers for the core | Monomers for the envelope |
| --- | --- |
| 1,3-butadiene, isoprene, n-butyl acrylate, ethyihexyl acrylate or a mixture of these, where appropriate together with crosslinking monomers | Styrene, acrylonitrile, (meth)acrylate, where appropriate having reactive groups, as described herein |

Instead of graft polymers whose structure has more than one shell it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

The elastomers D) described may also be prepared by other conventional processes, e.g. by suspension polymerization.

Other suitable elastomers which may be mentioned are thermoplastic polyurethanes, as described in EP-A 115 846, EP-A 115 847, and EP-A 117 664, for example.

It is, of course, also possible to use mixtures of the rubber types listed above.

The molding compositions of the invention may also comprise other conventional additives and processing aids. Merely by way of example, mention may be made here of additives for scavenging formaldehyde (formaldehyde scavengers), plasticizers, coupling agents, and pigments. The proportion of additives of this type is generally within the range from 0.001 to 5% by weight.

The molding compositions of the invention may comprise, as component D), based on the total weight of components A) and D), from 0 to 2% by weight, preferably from 10 ppm to 1.5% by weight, and in particular from 0.001 to 1% by weight, of an alkali metal compound and/or alkaline earth metal compound.

It is generally possible to use any alkaline earth metal cations and/or alkali metal cations, preferably lithium cations, sodium cations, potassium cations, or calcium cations.

For the purposes of the present invention, alkali metal compounds and alkaline earth metal compounds are those inorganic or organic salts which give an alkaline reaction in aqueous solution or suspension.

Examples which may be mentioned of inorganic salts are carbonates, hydrogencarbonates, hydroxides, oxides, and phosphates, particular preference being given to alkali metal carbonates, such as potassium carbonate and sodium carbonate.

Examples of organic salts are alcoholates of $C_2$–$C_{12}$-alcohols, phenolates, and salts of carboxylic acids having from 2 to 12 carbon atoms, particularly preferably citrates, oxalates, or tartrates.

Particular preference is given to alkali metal hydroxides, in particular potassium hydroxide and sodium hydroxide, these preferably being added during the preparation of the POM molding compositions in the form of an aqueous solution of from 10 to 70% strength, preferably from 40 to 60% strength, which may be fed together with the carbon black.

The thermoplastic molding compositions of the invention are prepared by mixing the components in a manner known per se, and it is therefore unnecessary to give detailed information in this connection. It is advantageous to mix the components in an extruder.

In one preferred preparation method, component B), and also, where appropriate, component(s) C) and/or D) may preferably be applied at room temperature to the pellets of A), followed by extrusion.

In another preferred embodiment, the addition of B) into the thermoplastic melt A) takes place by way of a solution, preferably an aqueous solution. This usually has a solids content of from 0.005 to 5%, preferably from 0.1 to 1%.

The thermoplastic molding compositions of the invention have a balanced property profile and have very good thermal stability, and due to these properties the processing of the compositions gives rise to little mold deposit, discoloration or formaldehyde emission. The resultant moldings are therefore particularly suitable for use as chain links, casters, slide rails, or gearwheels.

EXAMPLES

The following components were used:
Component A)
Polyoxymethylene copolymer made from 97.3% by weight of trioxane and 2.7% by weight of butanediol formal. The product also comprised about 3% by weight of unconverted trioxane and 5% by weight of thermally unstable fractions. After degradation of the thermally unstable fractions the copolymer had an MVR of 2.2 ml/10 min (190° C., 2.16 kg, to ISO 1133/B).
Component B)

|  | Content of active ingredient (aqueous solution) [%] | Viscosity (20° C.) ISO 2555 [mPa*S] | Molecular weight (Mw) by light scattering |
| --- | --- | --- | --- |
| B/1 | about 50 | about 450 | 2000 |
| B/2 | about 50 | about 14000 | 35000 |
| B/3 | about 10 | about 2500 | — |

Component C)
Furnace black from Degussa AG (Printex®90) particle size: 14 nm, DBP adsorption 95 ml/100 g, BET surface area 300 $m^2/g$ Components D)

D/1 Irganox®245 from Ciba Geigy:

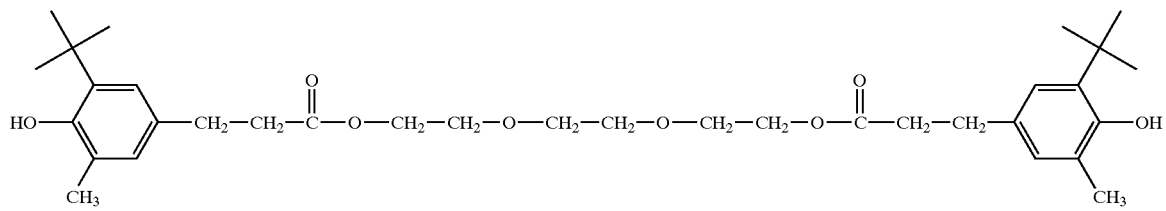

D/2 polyamide oligomer with molecular weight about 3000, prepared from caprolactam, hexamethylenediamine, adipic acid and propionic acid (as molecular weight regulator) by analogy with Examples 5-4 of U.S. Pat. No. 3,960,984 ("PA-dicapped").

D/3 Synthetic Mg silicate (Ambosol® from Societe Nobel, Puteaux) with the following properties:

| | |
|---|---|
| MgO content | ≧14.8% by weight |
| SiO₂ content | ≧59% by weight |
| Ratio SiO₂:MgO | 2.7 mol/mol |
| Bulk density | from 20 to 30 g/100 m [sic] |
| Loss on ashing | <25% by weight |

D/4 A melamine-formaldehyde condensate as in Example 1 of DE-A 25 40 207.

D/5 0.5% aqueous potassium carbonate solution

To prepare the molding compositions, component A was mixed with the amounts given in the Table of components B to D in a dry mixer at 23° C. The resultant mixture was introduced into a vented twin-screw extruder, homogenized and devolatilized at 230° C., and the homogenized mixture was discharged through a die as an extrudate, and pelletized.

The following were determined to test thermal stability:

| | |
|---|---|
| WL N₂: | the weight loss in percent from a specimen of 1.2 g of pellets on heating to 220° C. for 2 hours in nitrogen. |
| WL air: | the weight loss in percent from a specimen of 1.2 g of pellets on heating to 220° C. for 2 hours in air. |

The method of measuring the MVR was as stated for component A).

The mixing specifications for the molding compositions and the results of the measurements are given in Tables 1 to 4.

TABLE 1

| | | Comparative Examples | | |
|---|---|---|---|---|
| Mixing specification | Mixing specification | 1 | 2 | 3 |
| A | % by weight | 99.6 | 99.6 | 99.65 |
| D/3 | % by weight | 0.05 | 0.05 | — |
| D/1 | % by weight | 0.35 | 0.35 | 0.35 |
| D/4 | % by weight | 0.2 | 0.2 | 0.2 |
| C | % by weight | 0.25 | 0.25 | 0.25 |
| D/2 | % by weight | 0.04 | | |
| D/5 | ppm | 50 | 50 | 50 |
| N₂ | % | 0.33 | 0.49 | 0.13 |
| Air | % | 12.66 | 13.73 | 12.13 |
| MVR | ml/10 min | 1.07 | 1.55 | 1.48 |

TABLE 2

| Example | Mixing specification | 1 | 2 | 3 | 4 | 5 | 6 | 7 | 8 | 9 |
|---|---|---|---|---|---|---|---|---|---|---|
| A | % by weight | 99.4 | 99.45 | 99.4 | 99.45 | 99.1 | 99.15 | 99.145 | 99.195 | 99.3995 |
| D/3 | % by weight | 0.05 | | 0.05 | | 0.05 | | 0.05 | | 0.05 |
| D/1 | % by weight | 0.35 | 0.35 | 0.35 | 0.35 | 0.35 | 0.35 | 0.35 | 0.35 | 0.35 |
| D/4 | % by weight | 0.2 | 0.2 | 0.2 | 0.2 | 0.2 | 0.2 | 0.2 | 0.2 | 0.2 |
| C | % by weight | 0.25 | 0.25 | 0.25 | 0.25 | 0.25 | 0.25 | 0.25 | 0.25 | |
| B/1 | % by weight | 0.2 | 0.2 | 0.1 | 0.1 | 0.05 | 0.05 | 0.005 | 0.005 | 0.0005 |
| D/5 | ppm | 50 | 50 | 50 | 50 | 50 | 50 | 50 | 50 | 50 |

TABLE 2-continued

| Example | Mixing specification | 1 | 2 | 3 | 4 | 5 | 6 | 7 | 8 | 9 |
|---|---|---|---|---|---|---|---|---|---|---|
| $N_2$ | [%] | 0.15 | 0.16 | 0.12 | 0.01 | 0.15 | 0.15 | 0.20 | 0.07 | 0.08 |
| Air | [%] | 0.45 | 0.45 | 0.60 | 0.58 | 0.50 | 0.76 | 1.19 | 1.5 | 1.85 |
| MVR | [ml/10 min] | 1.69 | 1.71 | 1.55 | 1.62 | 1.77 | 1.89 | 1.9 | 1.89 | 1.55 |

TABLE 3

| Example | Mixing specification | 1 | 2 | 3 | 4 | 5 | 6 | 7 | 8 | 9 |
|---|---|---|---|---|---|---|---|---|---|---|
| A | % by weight | 99.4 | 99.45 | 99.4 | 99.45 | 99.1 | 99.15 | 99.145 | 99.195 | 99.3995 |
| D/3 | % by weight | 0.05 | | 0.05 | | 0.05 | | 0.05 | | 0.05 |
| D/1 | % by weight | 0.35 | 0.35 | 0.35 | 0.35 | 0.35 | 0.35 | 0.35 | 0.35 | 0.35 |
| D/4 | % by weight | 0.2 | 0.2 | 0.2 | 0.2 | 0.2 | 0.2 | 0.2 | 0.2 | 0.2 |
| C | % by weight | 0.25 | 0.25 | 0.25 | 0.25 | 0.25 | 0.25 | 0.25 | 0.25 | |
| B/2 | % by weight | 0.2 | 0.2 | 0.1 | 0.1 | 0.05 | 0.05 | 0.005 | 0.005 | 0.0005 |
| D/5 | ppm | 50 | 50 | 50 | 50 | 50 | 50 | 50 | 50 | 50 |
| $N_2$ | [%] | 0.35 | 0.10 | 0.31 | 0.29 | 0.29 | 0.07 | 0.12 | 0.1 | 0.14 |
| Air | [%] | 0.65 | 0.68 | 0.82 | 0.61 | 1.23 | 0.91 | 1.52 | 1.82 | 2.66 |
| MVR | (ml/10 min] | 1.5 | 1.42 | 1.49 | 1.35 | 1.53 | 11.36 | 1.35 | 1.37 | 1.51 |

TABLE 4

| Example | Mixing specification | 1 | 2 | 3 | 4 | 5 | 6 | 7 | 8 | 9 |
|---|---|---|---|---|---|---|---|---|---|---|
| A | % by weight | 99.4 | 99.45 | 99.4 | 99.45 | 99.1 | 99.15 | 99.145 | 99.195 | 99.3995 |
| D/3 | % by weight | 0.05 | | 0.05 | | 0.05 | | 0.05 | | 0.05 |
| D/1 | % by weight | 0.35 | 0.35 | 0.35 | 0.35 | 0.35 | 0.35 | 0.35 | 0.35 | 0.35 |
| D/4 | % by weight | 0.2 | 0.2 | 0.2 | 0.2 | 0.2 | 0.2 | 0.2 | 0.2 | 0.2 |
| C | % by weight | 0.25 | 0.25 | 0.25 | 0.25 | 0.25 | 0.25 | 0.25 | 0.25 | |
| B/3 | % by weight | 0.2 | 0.2 | 0.1 | 0.1 | 0.05 | 0.05 | 0.005 | 0.005 | 0.0005 |
| D/5 | ppm | 50 | 50 | 50 | 50 | 50 | 50 | 50 | 50 | 50 |
| $N_2$ | [%] | 0.10 | 0.11 | 0.06 | 0.11 | 0.09 | 0.12 | 0.19 | 0.31 | 0.22 |
| Air | [%] | 0.79 | 0.73 | 0.65 | 0.71 | 0.84 | 0.78 | 2.45 | 2.79 | 3.57 |
| MVR | [ml/10 mm] | 1.53 | 1.44 | 1.43 | 1.49 | 1.45 | 1.44 | 1.49 | 1.49 | 1.5 |

I claim:

1. A thermoplastic molding composition comprising, as substantive components,
   A) from 5% by weight to (99.99% by weight minus 1 ppb), based in components A) to D), of a polyoxymethylene homo- or copolymer,
   B) from 1 ppb to 1% by weight, based on the molding composition made from A) to D), of at least one polyethyleneimine homo- or copolymer,
   C) from 0.01 to 15% by weight of carbon black, and
   D) from 0 to 80% by weight of other additives,
   where the total pf percentages by weight of components A) to D) is always 100%.

2. A thermoplastic molding composition as claimed in claim 1, in which the amount of component B) present is from 1 ppm to 0.1% by weight.

3. A thermoplastic molding composition as claimed in claim 1, where the polyethyleneimine polymers have been selected from homopolymers of ethyleneimine, copolymers of ethyleneimine and amines having at least two amino groups, crosslinked polyethyleneimines, grafted polyethyleneimines, amidated polymers obtainable by reacting polyethyleneimines with carboxylic acids or with carboxylic esters, with carboxylic anhydrides, with carboxamides, or with carbonyl halides, alkoxylated polyethyleneimines, polyethyleneimines containing hydroxyl groups, amphoteric polyethyleneimines, and lipophilic polyethyleneimines.

4. A molding, film, fiber or foam obtained from the thermoplastic molding compositions claimed in claim 1.

5. The composition of claim 1 wherein the composition is prepared by heating the components at about 230° C.

6. The composition of claim 5 wherein the components are heated in an extruder at 230° C.

* * * * *